Figures 1, 1A:
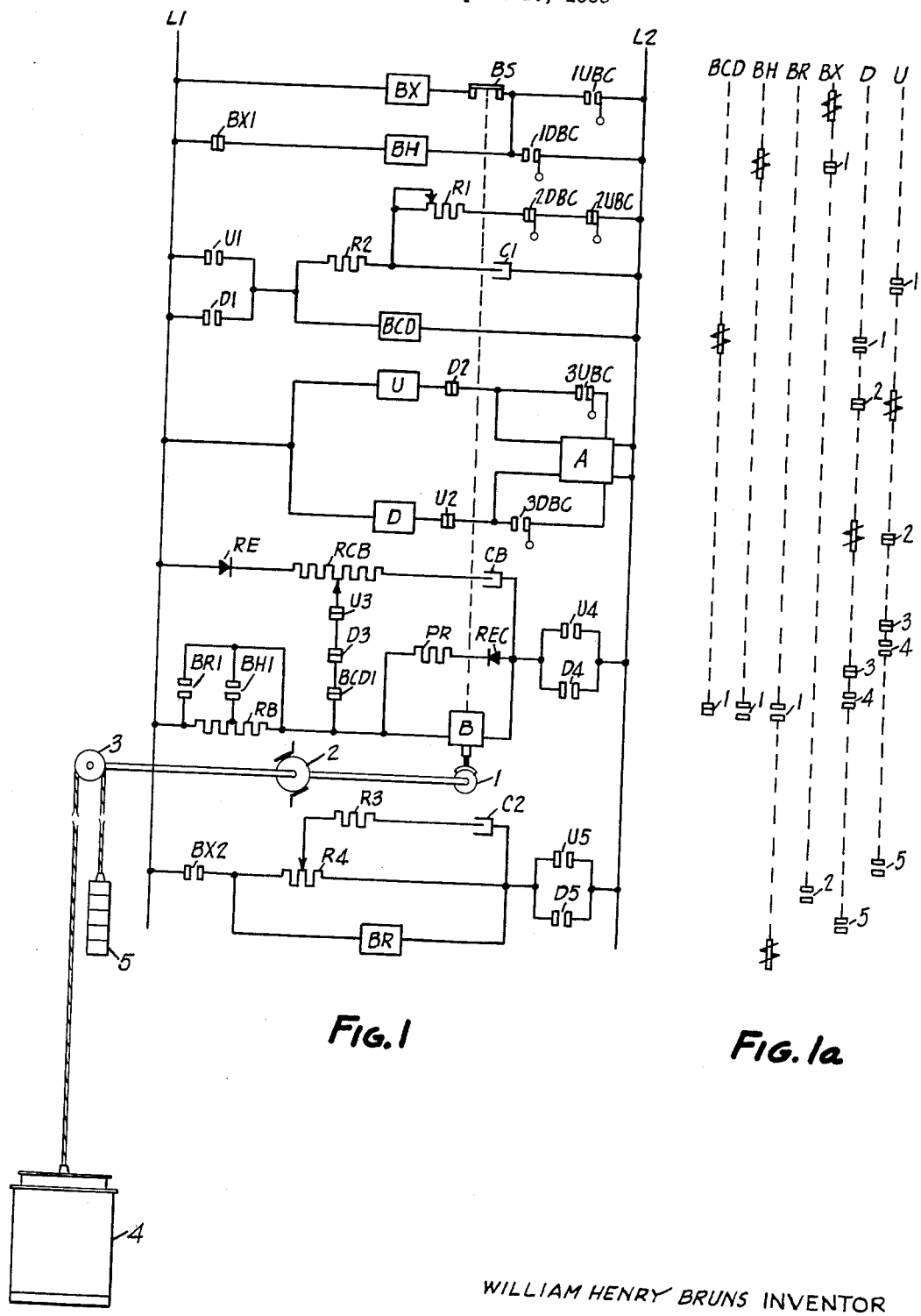

July 5, 1955

W. H. BRUNS 2,712,365

ELECTRIC BRAKE CONTROL FOR ELEVATORS

Filed April 10, 1953

WILLIAM HENRY BRUNS INVENTOR

BY *J. D. Sharon* ATTORNEY

United States Patent Office 2,712,365
Patented July 5, 1955

2,712,365
ELECTRIC BRAKE CONTROL FOR ELEVATORS

William Henry Bruns, Lincolndale, N. Y., assignor to Otis Elevator Company, New York, N. Y., a corporation of New Jersey Application April 10, 1953, Serial No. 348,027

16 Claims. (Cl. 187—29)

This invention relates to the control of electromechanical brakes particularly for elevators.

In systems of moving masses in which stopping of the masses occurs frequently it is often necessary that stops be made accurately, that is, the masses have to stop at a predetermined position. Stopping may be accomplished by a brake alone or it may be accomplished by control of the means driving the masses and by a brake used in conjunction therewith. In many applications it is also necessary for the brake to hold the masses against extraneous forces, such as gravity, after a stop has been made. Thus a brake may be required to exert a high retarding torque or a high holding torque. This is particularly true if the brake also has to function to stop moving masses under emergency conditions wherein the brake may stop the load with less than normal assistance from the driving means control.

In elevator installations, the application of a brake, capable of exerting a high torque as under conditions above noted, can frequently be felt by passengers in the elevator car as the car is brought to a normal stop at a landing.

The object of this invention is to provide a control for an electromechanical brake which will result in an imperceptible brake application.

The invention involves a control for permitting the brake to bring the moving masses to rest before the full brake force is applied.

In carrying out the invention, the brake is controlled in such a manner that it is applied with a gradually increasing braking force to aid in retarding movement of the moving masses and thereafter the braking force is decreased for a short interval before being increased to its maximum value; the masses being brought to a complete stop during the short interval of decreased braking force.

Features and advantages of the invention will be apparent from the foregoing and the description which follows.

In the drawings:

Figure 1 is a representation in "across-the-line" form of circuits for effecting the desired control, particularly suitable for elevators, and Figure 1a is a key diagram showing in spindle form the relationship of the coils and contacts of the switches employed in Figure 1.

The circuits are shown in a simplified manner to illustrate a preferred arrangement for control of the brake to attain the aforementioned object. It is to be understood that other considerations may superimpose other control functions. For example, the brake may, under certain circumstances, be applied without regard to harshness of the stop or unpleasantness of feeling to passengers in the elevator car.

Operation of switches which are actuated by car movement will be assumed to be effected by levelling cams, such as cams 284 of the Lewis and Bruns Patent No. 2,247,955. It is to be understood that switches of the present disclosure which are shown as actuated by cams 284, may be in addition to other switches actuated by the same cams to obtain other control functions. Also, rather than be energized directly by the switches actuated in accordance with car movement as shown, the switch coils in the brake control circuits may be energized through contacts of relays actuated by the switches. The invention may be applied to a control system such as illustrated in the aforementioned Lewis and Bruns patent although it is adapted to various elevator control systems. In this connection it should be understood that elevator control systems are very complex and that certain amplifications and alterations may be in order in adapting the invention to certain of these systems. It is also to be understood that, not only is the invention applicable to systems in which starting of the car is under the control of an attendant but also to other types of elevator systems, e. g. a system in which the passengers themselves control starting of the car or in which the car is started automatically. An attendant controlled elevator system will be assumed.

The switches employed in the circuits shown which are actuated in accordance with car movement are designated as follows:

1UBC—first up brake control switch
1DBC—first down brake control switch
2UBC—second up brake control switch
2DBC—second down brake control switch
3UBC—third up brake control switch
3DBC—third down brake control switch The coil of the electromechanical brake is designated B while contacts operated as the brake shoes are lifted free of the brake drum are designated BS. The brake is applied to the brake drum 1 on the shaft of the hoisting motor 2 which drives the sheave 3 for raising and lowering the elevator car 4 and counterweight 5.

The electromagnetic switches employed in the circuits shown are designated as follows:

U—up direction switch
D—down direction switch
BX—auxiliary brake switch
BH—brake holding switch
BR—brake resistance switch
BCD—brake condenser discharge switch While the elevator car is at rest at a floor preparatory to answering a demand for service, brake control switches 1UBC, 1DBC, 3UBC and 3DBC are in open condition and brake control switches 2UBC and 2DBC are in closed condition. Switches 1UBC, 1DBC, 3UBC and 3DBC are closed and switches 2UBC and 2DBC are opened incident to the starting of the car, for example as disclosed in the aforementioned Lewis and Bruns patent. Inasmuch as the invention is directed to the control of the brake in effecting the stopping of the car, the operation of the system during the starting and running of the car will not be described. It is believed sufficient to point out that during running of the car, switches BH and BCD and, assuming upward travel, switch U are in operated condition, the initial energizing circuit for the coil of switch U extending through switches indicated by block A. Also, capacitors C1 and CB are in a charged state. Switch BX, although operated in starting, is dropped out upon the release of the brake because of the separation of contacts BS. Thus switch BR which is also operated in starting, is dropped out as a result of the dropping out of switch BX to separate contacts BX2, being delayed in dropping out by the discharge of capacitor C2. The purpose of this arrangement is to short circuit resistance RB to enable the brake to be released and to insert a portion of it, by the separation of contacts BR1, as cooling resistance after the releasing operation has been effected.

As the car approaches a floor at which a stop is being made, brake control switches 1UBC and 3UBC are opened and brake control switch 2UBC is closed in effecting the final stopping operation.

In the circuits shown, these switches are principally for controlling the application of the brake but it is to be understood that the hoisting motor is also controlled to effect slow down of the car. It has been found satisfactory to open switches 1UBC and 1DBC at 12 inches from the floor. Also it has been found satisfactory to close switches 2UBC and 2DBC at 3 inches from the floor and to open switches 3UBC and 3DBC at ½ inch from the floor. Prior to the opening of switch 1UBC during a stop in the up direction, switches 1DBC and 3DBC are opened and switch 2DBC is closed and prior to the opening of switch 1DBC during a stop in the down direction, switches 1UBC and 3UBC are opened and switch 2UBC is closed.

Upon the opening of switch 1UBC during a stop in the up direction, the circuit for the coil of switch BH is interrupted, causing contacts BH1 to separate. Separation of contacts BH1 inserts the remainder of resistance RB in series with brake coil B. This reduces the excitation an amount such that the brake shoes touch lightly on the brake drum to exert a very slight braking force, insufficient of itself to stop the moving elevator car. Reclosing of brake switch BS is of no effect insofar as the circuit for coil BX is opened by brake control switches 1UBC and 1DBC. The purpose of this preferred operation is to prepare for a braking operation in which there is no time lag between deenergization of the brake coil and engagement of the brake shoes and the brake drum, thus increasing the accuracy of the stop. It is to be understood that this operation may be omitted in practicing this invention, in which case stopping accuracy may be adversely affected.

As the car continues toward the floor switch 2UBC is closed. It will be remembered that up to this time capacitor C1 has been connected across lines L1 and L2 and consequently has been fully charged. However, when switch 2UBC closes, capacitor C1 is connected in parallel with resistance R1 which in turn is connected in series with resistance R2 across lines L1 and L2. The charge on capacitor C1 therefore decays exponentially until the voltage across the capacitor reaches a final value determined by the ratio of R1 to R2. But, before the capacitor reaches this final value contacts U1 or D1 may be opened in which case the capacitor will discharge through resistor R2 and the coil of switch BCD, thus timing the drop out of switch BCD. It is apparent that the drop out time of switch BCD will vary depending on the capacitor voltage at the time contacts U1 are opened. The reason for varying the drop out time of switch BCD will be seen later as will be the mechanism by which it will be accomplished.

Prior to the opening of switch 3UBC, the circuit for the coil of up direction switch U through block A is interrupted, switch U being maintained energized thereafter through switch 3UBC. Upon the opening of switch 3UBC, the circuit for coil U is broken. As a result contacts U1, U4 and U5 are separated and contacts U2 and U3 are engaged. Separation of contacts U4 deenergizes brake coil B, but there is provided a low resistance discharge path around the coil through rectifier REC and resistor PR. This results in a gradual increase in the braking force as the brake coil energy is dissipated in resistor PR. Rectifier REC is provided to block the flow of current through resistor PR while the brake coil is connected across lines L1 and L2. Separation of contacts U1 does not result in coil BCD being deenergized immediately due to the charge on capacitor C1. After a time delay depending on the charge on capacitor C1, switch BCD falls out to engage contacts BCD1. Closing of these contacts provides a discharge path for capacitor CB through a portion of resistance RCB, contacts U3, D3, BCD1 and brake coil B. This tends to relift the brake, thus reducing the force applying the brake shoes to the brake drum. It is at this time of reduced braking force that the car comes to a stop. As the charge dissipates itself in coil B, the brake is again applied with increasing force until the maximum brake force is applied to hold the car at the landing. The portion of resistance RCB through which capacitor CB discharges may be varied to change the degree to which the brake force is reduced. Rectifier RE directs the discharge path for capacitor CB to the brake coil alone.

It was pointed out above that the charge on capacitor C1 and hence the timing of switch BCD varies. This is dependent upon the time it takes the car to travel from the point at which switch 2UBC closes and that at which switch 3UBC opens. It will now be disclosed why such an arrangement is desirable. If the system were such that the elevator car came to a stop while the brake is being applied subject to the stored-up brake coil energy being dissipated in resistor PR, the brake application may be felt by passengers in the car. Consequently, to have an imperceptible brake application, the brake force is reduced as by discharging capacitor CB through brake coil B and controlling the instant at which the discharge commences so that the car comes to a stop when the braking force is so reduced. In order to effect the reduction in brake pressure at the proper time, the point at which the brake pressure is relieved is varied in accordance with the speed of the car. It is to accomplish this, that switch BCD is timed in dropping out, and the time delay is varied.

It has been seen that prior to switch BCD dropping out, the braking force is gradually being increased. Thus if the discharge of capacitor CB was instituted at the same instant under all operating conditions, the braking force would always increase to the same value before being reduced by the pulse from condenser CB and then increased again. But this value of braking force may be sufficient to stop a car before the pulse is applied. Therefore the charge on capacitor C1 and hence the timing of switch BCD is varied depending on the speed of the car in the braking zone defined by switches 2UBC and 3UBC. If the car is travelling at a comparatively high speed, switch BCD is delayed longer in timing out. The effect of this is to permit the brake to be applied for a longer period of time with increasing brake force before capacitor CB is discharged through brake coil B. Conversely, if the car is travelling at a comparatively low speed, switch BCD is permitted to drop out shortly after deenergization of its coil circuit. This permits capacitor CB to discharge through the brake coil after the brake is applied for a short time. It is to be noted that if the elevator control system is such that the car will always enter the braking zone at a constant speed, there will be no need to vary the point at which capacitor CB discharges through the brake coil and hence the mechanism for varying the instant at which capacitor CB discharges can be omitted.

The mechanism for effecting the varying time delays of switch BCD is to be found in the BCD coil circuit. Fundamentally, it is dependent on the time it takes an elevator car to pass two fixed positions in the hoistway. These positions are the point at which switch 2UBC or 2DBC closes and the point at which switch 3UBC or 3DBC opens, points 3 inches and ½ inch from the floor respectively. Referring specifically to the BCD coil circuit this will be more fully explained. Prior to the car reaching the 3 inch point from the floor, capacitor C1 has a full charge insofar as it is, in effect, connected directly across the lines L1 and L2. However when the car reaches the 3 inch point, resistance R1 is connected to line L2 through brake control switch 2DBC or 2UBC and consequently a lower voltage is connected across capacitor C1. Capacitor C1, therefore discharges exponentially tending toward a lower charge commensurate with the lower voltage. When the car reaches the ½ inch point and contacts U1 or D1 separate the capacitor also discharges through switch BCD to time it in falling out. If the car is travelling at a high speed and passes quickly between the two positions, the charge on capacitor C1 will remain high and hence the timing on switch BCD will be comparatively long. On the other hand if the car is travelling at a low speed and passes slowly between the two positions the charge on capacitor C1 will have time to decrease to a low value and the timing on switch BCD will be comparatively short.

As has been seen above these are the desired characteristics, namely; when the car is travelling fast the brake will be applied for a longer period of time with gradually increasing brake pressure before capacitor CB is discharged through the brake coil, and when the car is travelling slow the brake will be applied for a short period of time before capacitor CB is discharged through coil B. Thus it is assured that the braking force will be reduced at the time the elevator car comes to a stop and not before.

The following brake apparatus has been found to provide an imperceptible brake application in accordance with this invention:

Brake coil; 2250 turns of No. 17 wire,
Brake cores provided in accordance with teachings of Patent No. 2,149,418,
Normal running, i. e., contacts BR1 separated, contacts BH1 engaged; brake coil current 2.75 amps.,
Dragging brake, i. e., contacts BR1 separated, contacts BH1 separated; brake coil current 1.2 amps.,
Capacitor CB; 4800 microfarads.

Having in mind the preferred arrangement of this invention above disclosed, other arrangements may present themselves. For example, other circuits may be resorted to for a gradual brake application before discharge of the capacitor through the brake coil. Then again other energy storing devices or energy supply means may be employed instead of capacitor CB. A tachometer generator may be used to measure the speed of the elevator car rather than resort to the circuit disclosed which charges a capacitor for the time it takes the car to pass two fixed points in the hoistway. Additional circuit arrangements may be used for controlling the brake under different conditions which it might be desirable to consider. Various forms of electromechanical brakes may be employed. Also, although the invention is particularly suitable for variable voltage elevator systems, it may also be applied to systems in which other motor controlling means are used and systems in which the brake alone is used to effect stopping at a landing.

Thus as many modifications could be made to the above preferred arrangement for carrying out the objects of this invention and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A system for controlling the application of an electromechanical brake of an elevator system in bringing the elevator car to rest at a landing at which a stop is being made, said brake having a release coil connected to a source of current during running of the car, said system comprising, switching means actuated by car movement for disconnecting said brake release coil from said source at a point a fixed distance from said landing, means for dissipating the energy stored in said brake release coil for causing a gradual increase in the braking force after disconnection of said coil from said source, and means operable at a time after the car passes said point determined by the speed of the car for supplying a pulse of current to relieve temporarily the brake pressure as the car comes to a stop.

2. A system for controlling the application of an electromechanical brake of an elevator system in bringing the elevator car to rest at a landing at which a stop is being made, said brake having a release coil connected to a source of current during running of the car, said system comprising, switching means actuated by car movement for disconnecting said brake release coil from said source as the car arrives at a point a certain distance from said landing, means for dissipating the energy stored in said brake release coil for causing a gradual increase in the braking force after disconnection of said coil from said source, and means controlled by the speed of the car for thereafter supplying a pulse of current to relieve temporarily the brake pressure as the car comes to a stop.

3. A system for controlling the application of an electromechanical brake of an elevator system in bringing the elevator car to rest at a landing at which a stop is being made, said brake having a release coil connected to a source of current during running of the car, said system comprising, switching means actuated by car movement for disconnecting said brake release coil from said source as the car arrives at a point a certain distance from said landing, means for dissipating the energy stored in said brake release coil for causing a gradual increase in the braking force after disconnection of said coil from said source, means operable at a distance toward said landing from said point of certain distance determined by the time it took the car to travel a fixed distance for supplying a pulse of current to relieve temporarily the brake pressure as the car comes to a stop.

4. A system for controlling the application of an electromechanical brake of an elevator system in bringing the elevator car to rest at a landing at which a stop is being made, said brake having a release coil connected to a source of current during running of the car and brake shoes for engaging a brake drum, said system comprising, means operable as the car approaches said landing but prior to arriving at a point a certain distance therefrom for decreasing the energization of said brake release coil to cause the brake shoes to be lightly applied to the drum, switching means actuated by car movement for disconnecting said brake release coil from said source as the car arrives at said point a certain distance from said landing, means for dissipating the energy stored in said brake release coil for causing a gradual increase in the braking force after disconnection of said coil from said source, means operable at a distance toward said landing from said point of certain distance determined by the time it took the car to travel a fixed distance to said point of certain distance for supplying a pulse of current to relieve temporarily the brake pressure as the car comes to a stop to obviate the application of the brake being felt in the car.

5. A system for controlling the application of an electromechanical brake of an elevator system in bringing the elevator car to rest at a landing at which a stop is being made, said brake having a release coil connected to a source of current during running of the car and brake shoes for engaging a brake drum in effecting the stopping operation, said system comprising, means for disconnecting said brake release coil from said source, a resistance connected in parallel with said brake release coil for dissipating the energy stored in said brake for causing a gradual increase in the braking force after disconnection of said coil from said source, a capacitor connected to said source, and a switch for connecting said capacitor across said brake release coil to supply a pulse of current to relieve the brake pressure as the car comes to a stop to obviate application of the brake being felt in the car.

6. A system for controlling the application of an electromechanical brake of an elevator system in bringing the elevator car to rest at a landing at which a stop is being made, said brake having a release coil connected to a source of current during running of the car and brake shoes for engaging a brake drum in effecting the stopping operation, said system comprising, a control switch actuated in accordance with movement of the elevator car as it approaches said landing, means responsive to the operation of said switch for disconnecting said brake release coil from said source, a resistance connected in parallel with said brake release coil for dissipating the energy stored in said brake for causing a gradual increase in the braking force after disconnection of said coil from said source, a capacitor connected to said source, and a switch for connecting said capacitor across said brake release coil after operation of said control switch to supply a pulse of current to relieve the brake pressure as the car comes to a stop to obviate application of the brake being felt in the car.

7. A system for controlling the application of an electromechanical brake of an elevator system in bringing the elevator car to rest at a landing at which a stop is being made, said brake having a release coil connected to a source of current during running of the car and brake shoes for engaging a brake drum in effecting the stopping operation, said system comprising, a control switch actuated in accordance with movement of the elevator car as it approaches said landing, a capacitor connected to said source, means responsive to the operation of said switch for disconnecting said capacitor and said brake release coil from said source, a resistance connected in parallel with said brake release coil for dissipating the energy stored in said brake for causing a gradual increase in the braking force after disconnection of said coil from said source, a second capacitor connected to said source, and a time delay electromagnetic switch, the coil of which is connected in parallel with said first capacitor, for connecting said second capacitor across said brake release coil to supply a pulse of current to relieve the brake pressure as the car comes to a stop to obviate application of the brake being felt in the car, said second capacitor being connected across said brake coil at a time after operation of said control switch depending on the charge on said first capacitor.

8. A system for controlling the application of an electromechanical brake of an elevator system in bringing the elevator car to rest at a landing at which a stop is being made, said brake having a release coil connected to a source of current during running of the car and brake shoes for engaging a brake drum in effecting the stopping operation, said system comprising a plurality of control switches actuated in accordance with movement of the elevator car as it approaches said landing, one of said switches being actuated when said car is a certain distance from said landing, a second of said switches being actuated when said car is at a point a less distance from said landing, a capacitor connected to said source, means responsive to the operation of said one switch for gradually decreasing the charge on said capacitor, means responsive to the operation of said second switch for disconnecting said capacitor and said brake release coil from said source, a resistance connected in parallel with said brake release coil for dissipating the energy stored in said brake for causing a gradual increase in the braking force after disconnection of said coil from said source, a second capacitor connected to said source, and a time delay electromagnetic switch, the coil of which is connected in parallel with said first capacitor, for connecting said second capacitor across said brake release coil to supply a pulse of current to relieve the brake pressure as the car comes to a stop to obviate application of the brake being felt in the car, said second capacitor being connected across said brake coil at a time after operation of said second switch depending on the charge on said first capacitor, said charge being determined by the time it took the car to travel the distance between the points at which said first and second switches are operated.

9. A system for controlling the application of an electromechanical brake of an elevator system in bringing the elevator car to rest at a landing at which a stop is being made, said brake having a release coil connected to a source of current during running of the car and brake shoes for engaging a brake drum in effecting the stopping operation, said system comprising, a plurality of control switches actuated in accordance with movement of the elevator car as it approaches said landing, one of said switches being actuated when said car is a certain distance from said landing, a second of said switches being actuated when said car is at a point a less distance from said landing and a third of said switches being actuated when said car is at a point a still less distance from said landing, a resistance, means responsive to the operation of said one switch for connecting said resistance in series with said brake release coil to decrease the brake coil energization, said resistance being of a value to cause the brake shoes to just rest on the drum, a capacitor connected to said source, means responsive to the operation of said second switch for gradually decreasing the charge on said capacitor, means responsive to the operation of said third switch for disconnecting said capacitor and said brake release coil from said source, a second resistance connected in parallel with said brake release coil for dissipating the energy stored in said brake for causing a gradual increase in the braking force after disconnection of said coil from said source, a second capacitor connected to said source, and a time delay electromagnetic switch, the coil of which is connected in parallel with said first capacitor, for connecting said second capacitor across said brake release coil to supply a pulse of current to relieve the brake pressure as the car comes to a stop to obviate application of the brake being felt in the car, said second capacitor being connected across said brake coil at a time after operation of said third switch depending on the charge on said first capacitor, said charge being determined by the time it took the car to travel the distance between the points at which said second and third switches are operated.

10. A circuit for controlling application, from a released position, of an electromechanical brake for a rotatable member, said brake having a brake coil, said circuit comprising, a current supply, means for increasing the braking force by gradually decreasing the brake coil current, means for thereafter decreasing the braking force by transiently increasing the brake coil current, and means for controlling the time at which the brake coil current is transiently increased such that the brake drum is brought to a stop during said transient increase of brake coil current.

11. A circuit for controlling application, from a released position, of an electromechanical brake having a brake coil, brake shoes and a brake drum, said circuit comprising, a current supply, a resistance in series with said brake coil which when connected in series therewith decreases the current through said brake coil an amount sufficient to cause the brake shoes to rest on the brake drum, means operable after the brake shoes are resting on the drum for increasing the braking force by gradually further decreasing the brake coil current, means for thereafter decreasing the braking force by transiently increasing the brake coil current, and means for controlling the time at which the brake coil current is transiently increased so that the brake drum comes to a stop when the brake coil current is transiently increased.

12. A circuit for controlling application, from a released position, of an electromechanical brake having a brake coil, brake shoes and a brake drum, so that the brake drum comes to rest at a time when the braking force is transiently reduced, said circuit comprising, a current supply, a control switch operable to disconnect said brake coil from said current supply, a resistance in series with said brake coil which when connected in series with said brake coil decreases the current therethrough an amount sufficient to cause the brake shoes to rest on the brake drum, means for increasing the braking force by gradually decreasing the brake coil current after said control switch is operated, means for decreasing the braking force by transiently increasing the brake coil current, and means for controlling the time at which the brake coil current is transiently increased.

13. A circuit for controlling application, from a released position, of an electromechanical brake having a brake coil, brake shoes and a brake drum, so that the brake drum comes to rest at a time when the braking force is transiently reduced, said circuit comprising, a current supply, a control switch operable to disconnect said brake coil from said current supply, a resistance in series with said brake coil which when connected in series therewith decreases the current through said brake coil an amount sufficient to cause the brake shoes to rest on the brake drum, means for increasing the braking force by gradually decreasing the brake coil current after said control switch is operated, a capacitor connected in parallel with said brake coil for decreasing the braking force by transiently increasing the brake coil current, and means for controlling the time at which the brake coil current is increased by said capacitor discharging through said brake coil.

14. A circuit for controlling application, from a released position, of an electromechanical brake having a brake coil, brake shoes and a brake drum, said circuit comprising, a current supply, a control switch operable to disconnect said brake coil from said current supply, a resistance in series with said brake coil for decreasing the current through said brake coil an amount sufficient to cause the brake shoes to rest on the brake drum, a low resistance path in parallel with said brake coil wherein energy stored in said brake coil can be dissipated thus gradually increasing the braking force after said control switch is operated, a capacitor connected in parallel with said brake coil for decreasing the braking force by transiently increasing the brake coil current, and a time delay switch for controlling the time at which the brake coil current is increased by said capacitor discharging through said brake coil such that said brake drum is brought to rest when the brake coil current is transiently increased.

15. A circuit for controlling application, from a released position, of an electromechanical brake having a brake coil, brake shoes and a brake drum, so that said brake drum comes to rest at a time when the braking force is transiently reduced, said circuit comprising, a current supply, a control switch operable to disconnect said brake coil from said current supply, a low resistance path in parallel with said brake coil wherein energy stored in said brake coil can be dissipated thus gradually increasing the braking force after said control switch is operated, a capacitor connected in parallel with said brake coil for decreasing the braking force by transiently increasing the brake coil current, and a time delay switch for controlling the time at which the brake coil current is increased by said capacitor discharging through said brake coil.

16. In an elevator system comprising, an elevator car moveable in a hoistway, an elevator machine to so move said car, said machine including a brake having a rotatable brake drum, brake shoes adapted to engage said drum, spring means to apply said shoes to said drum, and a brake coil to compress said spring means and remove said shoes from engagement with said drum, apparatus for controlling application of said brake to stop said car at a landing comprising, a source of electrical potential, a first and second electrical contacting means, each having a pair of contacts, a third electrical contacting means having two pairs of contacts, said contacting means being adapted to be actuated when said car is at a first relatively distant, a second intermediate, and a third near position to a landing respectively, a first resistor connected across said first contacting means paired contacts, one terminal of said resistor being connected to one side of said source and the other terminal of said resistor being connected to one terminal of said brake coil, the other brake coil terminal being connected to the second side of said source through the first pair of contacts of said third contacting means, a unidirectional current conducting element connected across said brake coil to provide a parallel path wherein energy stored in said coil is dissipated when said coil is disconnected from said source, an electromagnetic switch having a coil and two contacts, said coil being connected across said source through the second pair of contacts of said third contacting means, a second resistor and a first capacitor connected in series relation across said coil, a third resistor, one terminal of which is connected to the junction between said second resistor and said capacitor, and the other terminal of which is connected through said second contacting means paired contacts to said second side of said source, and a second capacitor resistively connected across said brake coil through said contacts of said electromagnetic switch.

No references cited.